United States Patent
Mandliwala et al.

(10) Patent No.: US 11,463,300 B2
(45) Date of Patent: Oct. 4, 2022

(54) REMEDIATING FALSE POSITIVES OF INTRUSION DETECTION SYSTEMS WITH GUEST INTROSPECTION

(71) Applicant: VMware, Inc., Palo Alto, CA (US)

(72) Inventors: Nafisa Mandliwala, Santa Clara, CA (US); Sirisha Myneni, Santa Clara, CA (US); Robin Manhas, Cupertino, CA (US); Baibhav Singh, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/927,542

(22) Filed: Jul. 13, 2020

(65) Prior Publication Data
US 2022/0014425 A1 Jan. 13, 2022

(51) Int. Cl.
*H04L 41/0681* (2022.01)
*H04L 41/0695* (2022.01)
*H04L 41/0631* (2022.01)
*H04L 9/40* (2022.01)

(52) U.S. Cl.
CPC ...... *H04L 41/0645* (2013.01); *H04L 41/0681* (2013.01); *H04L 41/0695* (2013.01); *H04L 63/1416* (2013.01)

(58) Field of Classification Search
CPC ............ H04L 41/0645; H04L 41/0681; H04L 41/0695; H04L 63/1416
USPC ...................................................... 709/224
See application file for complete search history.

(56) References Cited

U.S. PATENT DOCUMENTS

| | | | |
|---|---|---|---|
| 7,991,726 B2 * | 8/2011 | Zhou | H04L 63/1416 706/47 |
| 9,654,510 B1 * | 5/2017 | Pillai | H04L 63/1416 |
| 9,680,877 B2 * | 6/2017 | Duffield | H04L 45/38 |
| 11,182,163 B1 | 11/2021 | Beals et al. | |
| 2009/0144216 A1 * | 6/2009 | Zhou | H04L 63/1416 706/47 |
| 2011/0004935 A1 * | 1/2011 | Moffie | G06F 21/552 726/23 |
| 2012/0222070 A1 | 8/2012 | de los Reyes et al. | |

(Continued)

OTHER PUBLICATIONS

U.S. Appl. No. 16/718,174., Titled "Corrective Action on Malware Intrusion Detection Using File Introspection".

(Continued)

*Primary Examiner* — James E Springer
*Assistant Examiner* — Patrick F Ngankam
(74) *Attorney, Agent, or Firm* — Patterson & Sheridan, LLP (57) ABSTRACT

The disclosure provides an approach for remediating false positives for a network security monitoring component. Embodiments include receiving an alert related to network security for a virtual computing instance (VCI). Embodiments include collecting, in response to receiving the alert, context information from the VCI. Embodiments include providing a notification to a management plane based on the alert and the context information. Embodiments include receiving, from the management plane, in response to the notification, an indication of whether the alert is a false positive. Embodiments include training a model based on the alert, the context information, and the indication to determine whether a given alert is a false positive.

22 Claims, 5 Drawing Sheets

(56) References Cited

U.S. PATENT DOCUMENTS

| 2016/0036846 | A1* | 2/2016 | Oliphant | G06F 21/55 |
| | | | | 726/23 |
| 2016/0162685 | A1* | 6/2016 | Feroz | G06F 9/45558 |
| | | | | 726/22 |
| 2017/0223046 | A1 | 8/2017 | Singh | |
| 2018/0196942 | A1 | 7/2018 | Kashyap et al. | |
| 2020/0175165 | A1 | 6/2020 | Murphy et al. | |
| 2020/0242611 | A1* | 7/2020 | Raman | G06Q 20/4016 |

OTHER PUBLICATIONS

Fine Tuning Your Intrusion Detection System to Mimimize False Positive Alerts, Jan. 31, 2017, <https://blog.rapid7.com/2017/01/31/fine-tuning-your-intrusion-detection-system-to-minimize-false-positive-alerts/>.

Unknown, "What is an Intrusion Prevention System?", PaloAlto Networks, Cyberpedia, 2019, 5 pages, https://www.paloaltonetworks.com/cyberpedia/what-is-an-intrusion-prevention-system-ips.

Unknown, "What is an Intrusion Detection System?", PaloAlto Networks, Cyberpedia, 2019, 4 pages, https://www.paloaltonetworks.com/cyberpedia/what-is-an-intrusion-detection-system-ids.

Unknown, "Trustwave Managed Detection Essential; Security Monitoring From Trustwave Experts", Trustware, 2019, 2 pages, https://www.trustwave.com.

* cited by examiner

REMEDIATING FALSE POSITIVES OF INTRUSION DETECTION SYSTEMS WITH GUEST INTROSPECTION

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a data center may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The rapid growth of network virtualization has led to an increase in large scale SDN data centers. The scale of such data centers may be very large, often including hundreds of servers with each server hosting hundreds of VCIs. With such scale comes a need to be able to operate such topologies securely.

A security monitoring component, such as an intrusion detection system (IDS), in a data center monitors network traffic to identify potential security threats, and raises an alarm when a potential threat is detected. However, because a security monitoring component may base its determinations on limited data, false positives may sometimes be generated. False positives can result in wasted resources, incorrect security determinations, and the like. As such, there is a need in the art for techniques to remediate false positives for security monitoring systems.

SUMMARY

Embodiments provide a method of remediating false positives for a network security monitoring component. Embodiments include receiving an alert related to network security for a virtual computing instance (VCI). Embodiments further include collecting, in response to receiving the alert, context information from the VCI. Embodiments further include providing a notification to a management plane based on the alert and the context information. Embodiments further include receiving, from the management plane, in response to the notification, an indication of whether the alert is a false positive. Embodiments further include training a model based on the alert, the context information, and the indication to determine whether a given alert is a false positive.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for remediating false positives of a security component, such as an intrusion detection system (IDS) in a network. In certain embodiments, an IDS analyzes network traffic in a data center in order to detect potential security threats. For example, the IDS may compare packets to signatures associated with threats. A signature generally defines a pattern associated with a known security threat. For example, a signature may define a behavior pattern (e.g., a certain network connection, a certain process execution, an anomalous pattern of resource usage, or the like) or certain data (e.g., a particular series of bytes in network traffic) known to be associated with a malicious attack. When the IDS detects a potential security threat, it may generate an alert, which may cause action to be taken to defend and protect against the threat. However, it may not be possible to maintain specific signatures for all potential threats due to performance concerns and practical limitations, and so generic signatures may sometimes be used. As a result, the IDS may sometimes generate alerts that are false positives due to legitimate packets matching generic signatures that are overly broad. Embodiments of the present disclosure provide techniques for detecting and remediating false positives from the IDS through the use of machine learning concepts.

In some embodiments, a machine learning (ML) engine trains a model to detect false positives based on features of alerts. In order to train the model, the ML engine gathers training data during a learning phase. For example, during the learning phase, alerts may be provided to the management plane for review by a user, such as a network administrator. Context information may be gathered for each alert and provided with the alert to the management plane so that the user is able to make an informed decision regarding whether the alert is a false positive. In some embodiments, an event and correlation engine registers with a thin agent on a VCI to collect context information for each alert related to the VCI, and provides the context information along with the alert to the management plane. The context information may include, for example, file events, application events, network events, user and protocol information, and the like.

The ML engine receives indications from the management plane based on user feedback indicating whether each alert is a false positive. As explained in more detail below, the ML engine then uses these indications to generate labeled training data for the model. For example, a training data instance may include features of a given alert (e.g., derived from the signature that triggered the given alert, as well as from the context information for the given alert) and a label indicating whether the given alert is a false positive based on the user feedback. The ML engine uses the labeled training data to train the model, as described in more detail below, such as using supervised or unsupervised machine learning techniques.

Once trained, the model is used to detect false positives from the IDS. In some embodiments, when an alert is received, context information is collected for the alert, and then input is provided to the trained model based on the alert and the context information, as described in more detail below. The model then outputs an indication of whether the alert is a false positive. If the alert is a false positive, the alert may be discarded and/or a notification may be provided to one or more entities (e.g., the management plane) indicating that the alert is a false positive. If the alert is not a false positive, then actions may be taken to address the potential security threat. For example, the alert may be provided the management plane and/or one or more security components (e.g., a firewall) so that the potential security threat may be addressed.

Figure 1:
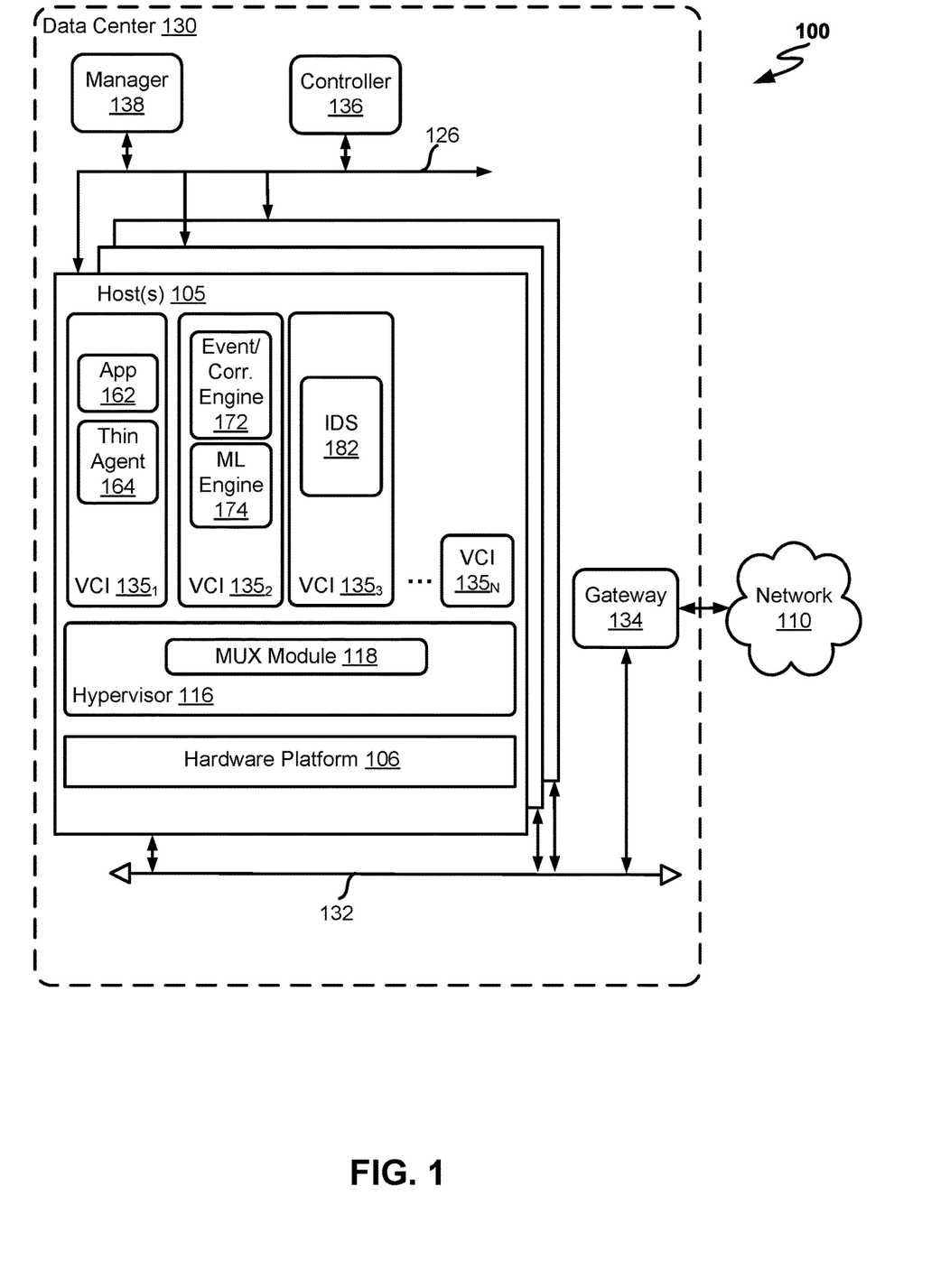
FIG. 1 depicts a block diagram of physical and virtual components of a network in which one or more embodiments of the present disclosure may be utilized.

FIG. 1 is a block diagram depicting physical and virtual components of a networking environment 100, in which one or more embodiments of the present disclosure may be utilized.

Networking environment 100 includes a data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_N$ (collectively referred to as VCIs 135 and individually referred to as VCI 135) that run concurrently on the same host. VCIs 135 may, for example, be virtual machines (VMs), virtual appliances, containers, and/ or the like. Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual tunnel endpoint (VTEP), etc., along with hardware drivers, may reside in the privileged virtual machine. Although aspects of the disclosure are described with reference to VMs, the teachings herein also apply to other types of VCIs or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Hypervisor 116 includes a MUX module 118, which may perform multiplexing operations with respect to VCIs 135. In some embodiments, MUX module 118 interfaces between event and correlation engine 172 and thin agents on VCIs 135, such as thin agent 164, to provide context information from VCIs 135 to event and correlation engine 172, as described in more detail below.

Gateway 134 provides VCIs 135 and other components in data center 130 with connectivity to network 110, and is used to communicate with destinations (not shown) external to data center 130. Gateway 134 may be a VCI, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or VCIs that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 generally represents a management plane comprising one or more computing devices responsible for receiving logical network configuration inputs, such as from a network administrator, defining one or more endpoints (e.g., VMs and/or containers) and the connections between the endpoints, as well as rules governing communications between various endpoints. In some embodiments, manager 138 communicates with hosts 105 via controller 136, which receives and transmits data to and from hosts 105 via management network 126. Manager 138 may provide an interface where a user, such as a network administrator, can review alerts with context information and provide feedback indicating whether the alerts are false positives. Manager 138 may also allow an administrator to define security policies and/or take other actions to protect data center 130 from security threats, such as blocking traffic related to alerts and removing entities (e.g., processes identified as malicious actors) from data center 130.

VCI 135$_1$ includes an app 162, which may, in some embodiments, be a client or server application that requests and/or responds to requests for data. VCI 135$_1$ further includes a thin agent 164, which generally represents an in-guest agent that corresponds to a component external to VCI 135$_1$. In particular, thin agent 164 is an agent of MUX module 118 and/or event and correlation engine 172. In some embodiments, thin agent 164 may be a driver that interacts with packet processing taking place at several layers in the networking stack of an OS. In one embodiment, thin agent 164 is a Microsoft® Windows® driver that uses the Windows® Filtering Platform (WFP). Thin agent 164 can collect information about VCI 135$_1$, such as context information related to alerts. In particular, thin agent 164 is configured to intercept network events (e.g., network pre-connect, connect, and disconnect events), file events (e.g., file access events), system events, process events, and the like that are generated due to calls made by applications, such as app 162, running in VCI 135$_1$ and deliver information (e.g., a type of the event, network addresses associated with the event, file names associated with the event, file locations associated with the event, user information associated with the event, process information associated with the event, etc.) about such events to MUX module 118 as further discussed herein.

In an example, an operating system running on VCI 135$_1$ provides libraries that deliver such information about such events generated based on calls made by applications running on the operating system to a registered client. Accordingly, thin agent 164 is registered with the operating system and receives such events occurring on VCI 135$_1$ from the operating system.

Thin agent 164 may also retrieve additional context information from VCI 135$_1$, such as application and user information. In some embodiments, a context engine (not shown) performs introspection into the guest OS running on VCI 135$_1$ in order to retrieve context information. For example, the context engine may register hooks (e.g., callbacks) with one or more modules (e.g., kernel-space modules or user-space modules) in the guest OS of VCI 135$_1$ in order to retrieve context information related to network events, and provides the context information to thing agent 164.

It is noted that the components depicted in VCI 135$_1$ may be representative of components of other VCIs 135 as well.

VCI 135$_2$ includes event and correlation engine 172. In some embodiments, event and correlation engine 172 registers with MUX module 118 to receive context information from thin agent 164 for alerts received from IDS 182. Event and correlation engine 172 communicates with ML engine 174 to determine whether a trained model indicates that alerts are false positives. Event and correlation engine 172 also communicates with manager 138 to provide alerts and context information for review by an administrator.

VCI 135$_2$ includes machine learning (ML) engine 174, which trains and utilizes a model for determining whether alerts from IDS 182 are false positives. While ML engine 174 and event and correlation engine 172 are depicted as two separate components in a single VCI, the functionality described with respect to these components may alternatively be by a single component or by a plurality of components on one or more VCIs.

VCI 135$_3$ comprises an intrusion detection system (IDS) 182, which may be a virtual appliance that analyzes network traffic to identify potential security threats. In some embodiments, IDS 182 compares packets to signatures associated with potential security threats, and generates an alert when it detects one of the signatures in a packet.

As described in more detail below with respect to FIG. 2, event and correlation engine 172 may gather context information from VCIs 135 related to alerts from IDS 182 for use in determining whether the alerts are false positives, such as through interaction with ML engine 174.

Figure 2:
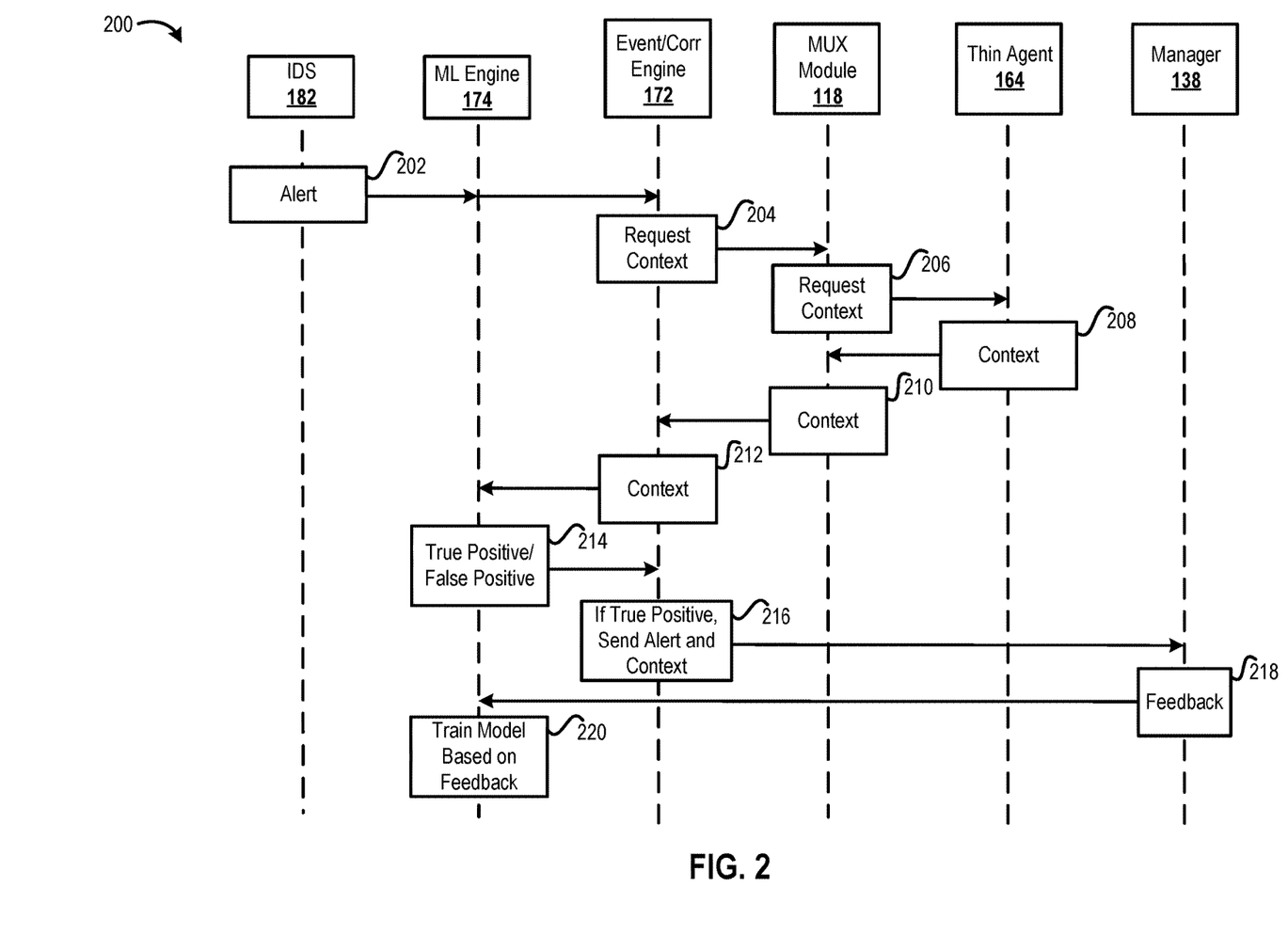
FIG. 2 depicts a block diagram of an example call flow between network components for remediating false positives of a security component, according to an embodiment.

FIG. 2 depicts a block diagram of an example call flow 200 between network components for remediating false positives of a security component, according to an embodiment. Call flow 200 includes IDS 182, ML engine 174, event and correlation engine 172, MUX module 118, thin agent 164, and manager 138 of FIG. 1.

At 202, IDS 182 generates an alert that is received by ML engine 174 and event and correlation engine 174. In an example, the alert is generated when IDS 182 detects a given signature in a packet sent or received by VCI 135$_1$ (e.g., by app 162) of FIG. 1.

Upon receiving the alert, event and correlation engine 172 requests context information related to the alert, at 204, from MUX module 118. At 206, MUX module requests the context information from thin agent 164. At 208, thin agent provides the context information to MUX module 118, which then provides the context information to event and correlation engine 172 at 210. The context information includes events and other information related to the alert from VCI 135$_1$ of FIG. 1.

If a model of ML engine 174 has already been trained, as described in more detail below with respect to FIG. 3, then event and correlation engine 172 provides the context information ML engine 174 for use in determining whether the alert is a false positive using the model. If the model has not yet been trained (e.g., during learning mode), then steps 212 and 214 are skipped, and event and correlation engine 172 sends the alert and the context information to manager 138 for feedback from an administrator. Once the model has been trained, event and correlation engine 172 may only send alerts that the model indicates are true positives to manager 138, filtering out false positives or simply notifying manager 138 that the alerts are false positives.

When the model has been trained, ML engine 174 provides features of the alert (e.g., based on the context information) as inputs to the model and receives output from the model indicating whether the alert is a false positive. ML engine 174 then provides the indication to event and correlation engine 172 at 214. If the alert is a false positive, then event and correlation engine 172 may drop the alert (e.g., taking no further action to address the alert) and/or may notify manager 138 that the alert is a false positive.

If the alert is a true positive (or if the model has not yet been trained), event and correlation engine 172 sends the alert and the context information to manager 138 at 216. Manager 138 may display the alert and context information via an interface for review by a user, such as an administrator. The user may provide feedback indicating whether the alert is a false positive, such as based on a review of the alert and the context information. In some embodiments, a signature that triggered the alert is also included with the alert, and is reviewed by the user. In some embodiments, only a subset of the context information is displayed by manager 138, as it may be impractical for the user to review a potentially very large amount of context information. For example, a predetermined subset of the context information known to be particularly useful in detecting false positives.

If the alert is a true positive, the user may take one or more preventative actions based on the alert. For example, the user may provide configuration input indicating that traffic related to the alert should be blocked or that one or more entities related to the alert should be disconnected from the network.

At 218, feedback from the user is provided by manager 138 to ML engine 174 (and/or, in some embodiments, event and correlation engine 172) for use in training (or retraining) the model. At 220, ML engine 174 trains the model based on the feedback. For example, features of the alert may be associated with a label indicating whether the alert is a false positive (e.g., according to the feedback), and this labeled training data instance may be used to train the model. Accordingly, subsequent alerts with similar features may be identified by the model as false positives, and may be dealt with as such (e.g., avoiding unnecessary processing, review, and potentially incorrect security determinations based on the false positives).

Figure 3:
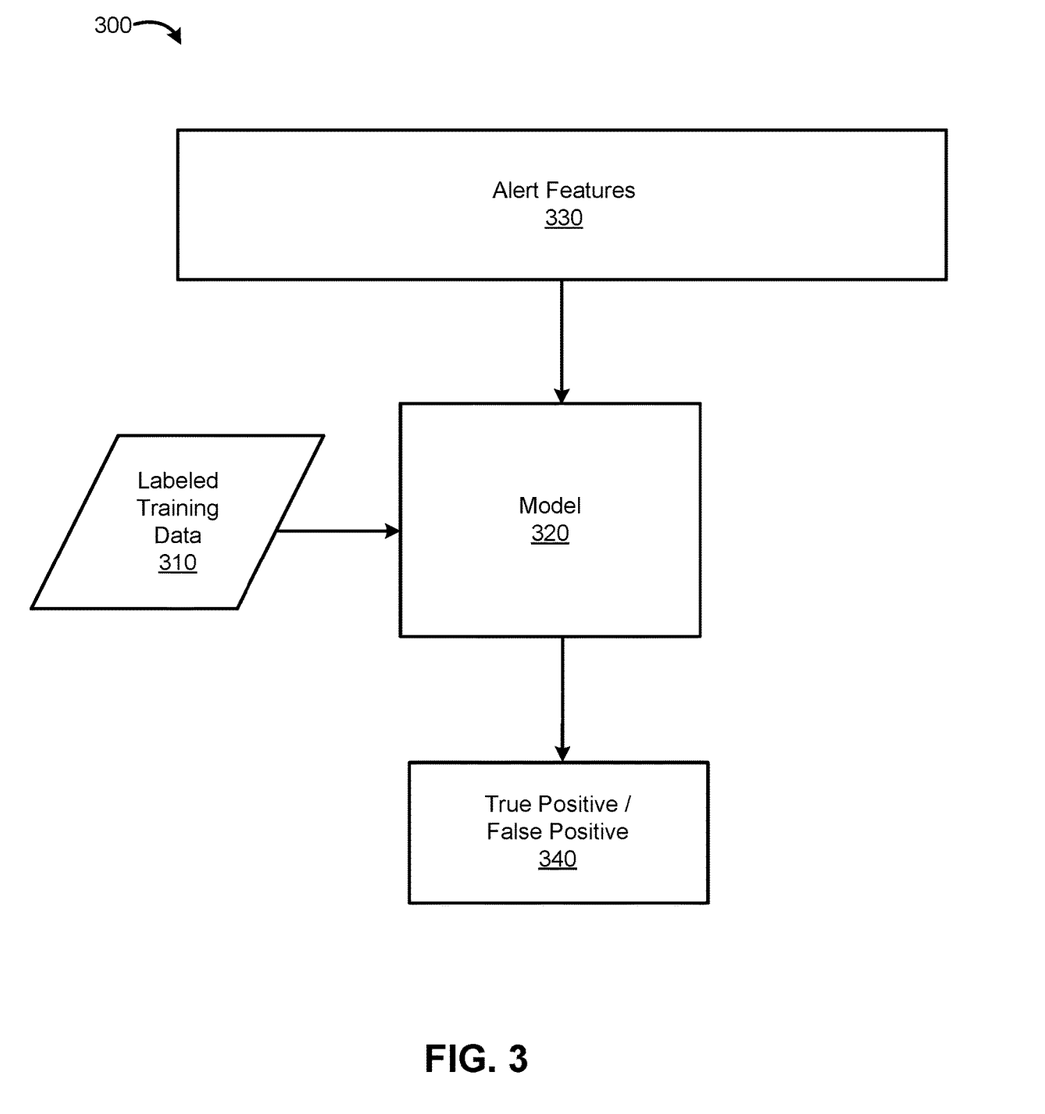
FIG. 3 is an illustration of training and using a model for detecting false positives of a security component according to embodiments of the present disclosure.

FIG. 3 is an illustration 300 of training and using a model for detecting false positives of a security component according to embodiments of the present disclosure. For example, illustration 300 may depict functionality of ML engine 174 of FIG. 1.

Labeled training data 310 is used to train model 320 using machine learning techniques. Machine learning techniques generally involve using a set of training inputs and training outputs to build a model that will output a value in response to inputs. Inputs may be described as "features". For example, each training data instance may include training data inputs or features (e.g., a signature, certain network events, file events, user information, process information, and the like associated with an alert) associated with a training data output or label (e.g., an indication of whether or not the alert is a false positive based on user feedback). A plurality of training data instances is used to train the model, such as by constructing a model that represents relationships between features and output values. In some embodiments, training involves providing training data inputs to the model and iteratively adjusting parameters of the model until the outputs from the model in response to the training data inputs match (or fall within a certain range of) the training data outputs associated with the training data inputs, or until a certain number of iterations have been completed without significant improvements in accuracy.

Features may be determined by extracting certain items of data from context information for an alert. For example, features extracted for an alert may include files read, files written, a user identifier and other user attributes for a user associated with a packet that triggered the alert, application information of an application associated with the packet that triggered the alert, an operating system, version information (e.g., a patch version of an application), a protocol, network events such as callbacks when connections are made or terminated (e.g., for transport control protocol (TCP), user datagram protocol (UDP), or internet control message protocol (ICMP) connections), whether traffic is inbound or outbound, and/or the like), process events (e.g., process start and stop times, process traffic information, process identifiers), and/or the like.

The trained model may be subjected to testing. Testing generally involves providing datapoints from a test dataset as inputs to the model, receiving labels as outputs, and verifying that the output labels match test labels. In some embodiments, a training data set generated based on user feedback (e.g., indicating whether given alerts are false positives) is split into training data and test data for use in the separate training and testing stages.

Model 320 may, for example, comprise a type of machine learning model known in the art, such as a neural network, a decision tree, a random forest, a long short term memory (LSTM) model, a gradient boosting machine, a linear regression model, or the like. In some embodiments, model 320 may comprise an ensemble of models that work together (e.g., on different subsets of input features or using different techniques) to determine a final output.

Once model 320 is trained, features 330 of an alert are provided as inputs to model 320, which outputs an indication 340 of whether the alert is a true positive or a false positive. For example, the alert may be a new alert received from IDS 182 of FIG. 1 for which user feedback has not been received. Indication 340 allows action to be taken for the new alert based on whether or not it is determined to be a false positive.

In some embodiments, if multiple alerts generated by the IDS based on a particular signature are determined to be false positives, a notification may be provided to the management plane so that the administrator may investigate whether there may be a problem with the signature or another issue that should be addressed in the network. In some cases, reports of false positives may be provided to the management plane so that trends may be identified and analyzed to determine additional remedial actions that may be appropriate.

Figure 4:
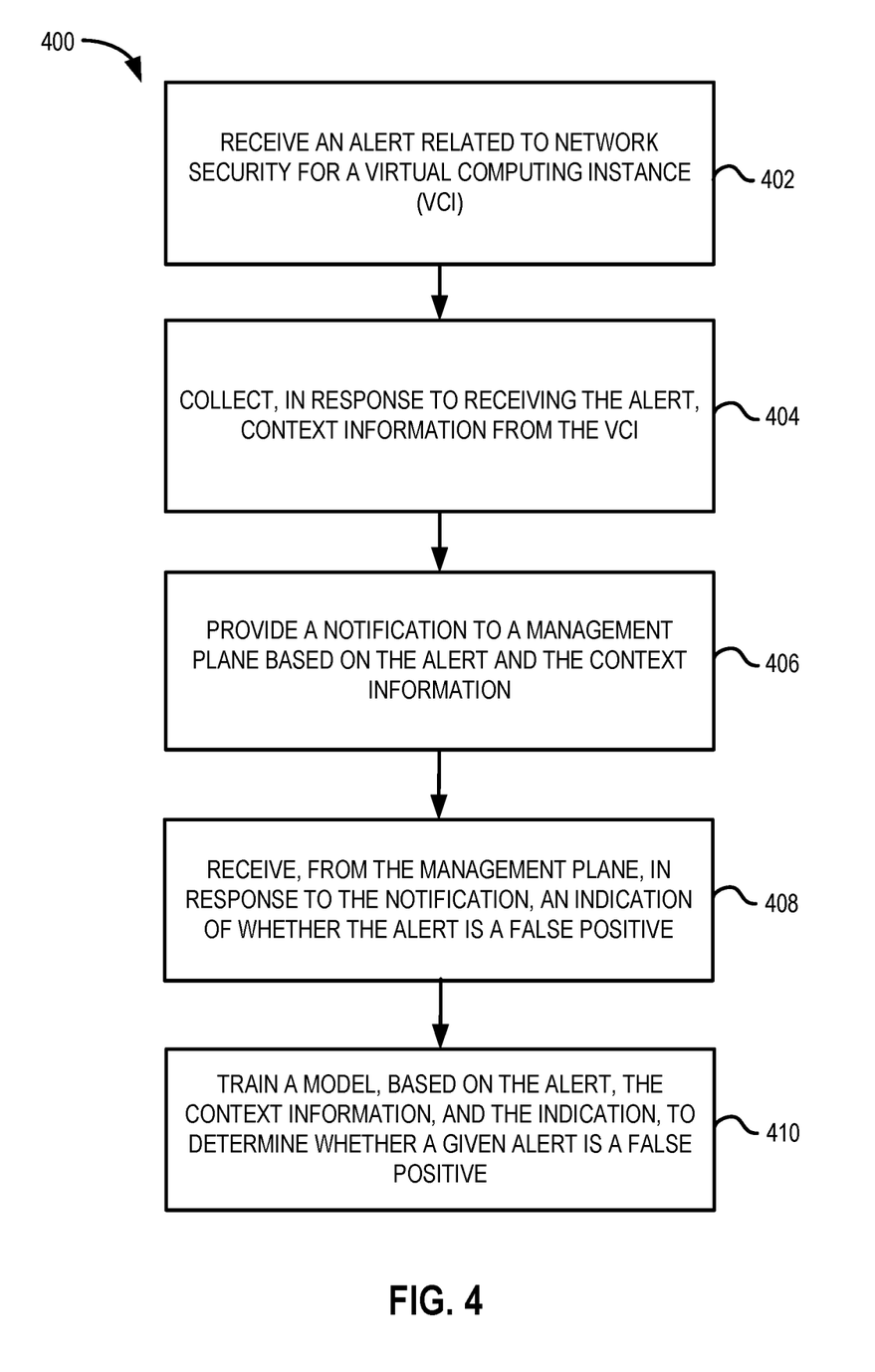
FIG. 4 depicts a flow diagram of a method related to remediating false positives of a security component according to embodiments of the present disclosure.

FIG. 4 depicts a flow diagram of a method 400 related to remediating false positives of a security component according to embodiments of the present disclosure. In some embodiments, method 400 is performed by one or more components of host 105 of FIG. 1, such as ML engine 174 and/or event and correlation engine 172 of FIG. 1

At step 402, an alert related to network security for a virtual computing instance (VCI) is received. In some embodiments, the security component is IDS 182 of FIG. 1.

At step 404, in response to receiving the alert, context information is collected from the VCI. For example, the context information may be collected from thin agent 164 via MUX module 118 of FIG. 1.

At step 406, a notification is provided to a management plane based on the alert and the context information. For example the alert and context information may be provided to manager 138 of FIG. 1, which may display the alert and context information for review by an administrator.

At step 408, an indication of whether the alert is a false positive is received from the management plane. For example, the administrator may review the alert and context information and provide feedback indicating whether the alert is a false positive, which may be provided by manager 138 to ML engine 174 of FIG. 1.

At step 410, a model is trained, based on the alert, the context information, and the indication, to determine whether a given alert is a false positive. For example, features of the alert may be generated based on the context information, and may be associated with a label indicating whether the alert is a false positive in order to generate a training data instance for use in training the model.

Figure 5:
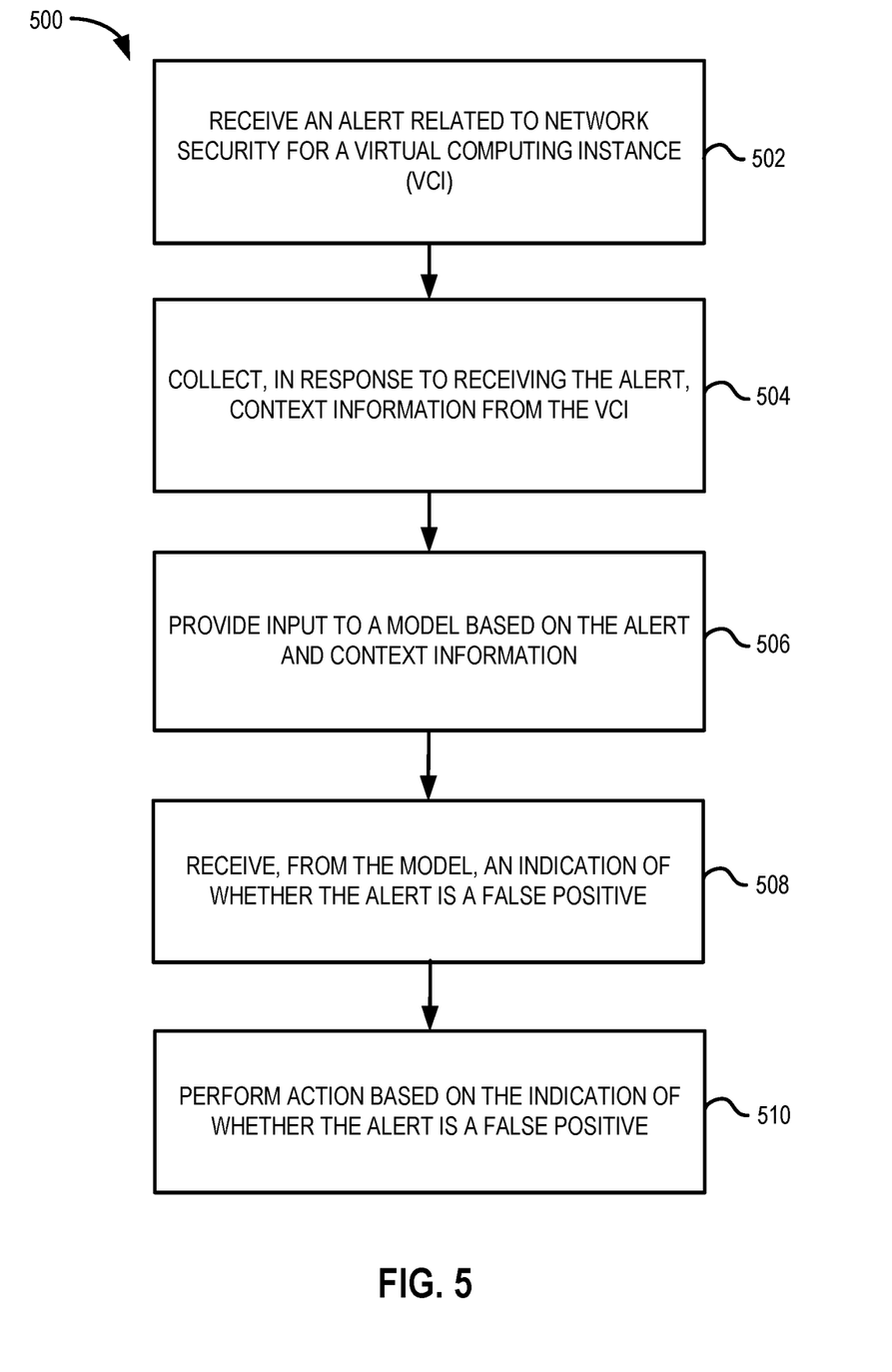
FIG. 5 depicts a flow diagram of another method related to remediating false positives of a security component according to embodiments of the present disclosure.

FIG. 5 depicts a flow diagram of another method 500 related to remediating false positives of a security component according to embodiments of the present disclosure. In some embodiments, method 500 is performed by one or more components of host 105 of FIG. 1, such as ML engine 174 and/or event and correlation engine 172 of FIG. 1

At step 502, an alert related to network security for a virtual computing instance (VCI) is received. In some embodiments, the security component is IDS 182 of FIG. 1.

At step 504, in response to receiving the alert, context information is collected from the VCI. For example, the context information may be collected from thin agent 164 via MUX module 118 of FIG. 1.

At step 506 input is provided to a model based on the alert and context. For example, the model may have been trained as described above with respect to FIG. 4, and the values input to the model may be features derived from the alert and the context information.

At step 508, an indication of whether the alert is a false positive is received from the model. For example, the model may output a label indicating whether the alert is a true positive or a false positive.

At step 510, an action is performed based on the indication of whether the alert is a false positive. In some embodiments, if the output from the model indicates that the alert is a false positive, the action comprises one or more of: discarding the new alert; or notifying the management plane that the alert is a false positive. In certain embodiments, if the output from the model indicates that the alert is not a false positive, the action comprises notifying the management plane of the alert.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of remediating false positives for a network security monitoring component, comprising:
 receiving, by a host, an alert related to network security for a virtual computing instance (VCI) on the host, wherein the alert was generated by an intrusion detection system (IDS) running on the host based on a signature associated with a potential security threat;
 collecting, by the host, in response to receiving the alert, context information from the VCI;
 providing, by the host, a notification to a management plane based on the alert and the context information;
 receiving, by the host, from the management plane, in response to the notification, an indication of whether the alert is a false positive; and
 training, by the host, a machine learning model based on the alert, the context information, and the indication to determine whether a given alert is a false positive, wherein the training comprises:
  providing inputs to the machine learning model based on the alert and the context information;
  receiving, from the machine learning model, based on the inputs, one or more outputs indicating whether the alert is a false positive;
  comparing the one or more outputs to the indication; and
  adjusting one or more parameters of the machine learning model based on the comparing until an output of the one or more outputs matches the indication or until one or more other conditions are met.

2. The method of claim 1, wherein the context information comprises one or more of:
 files read;
 files written;
 user information;
 application information;
 an operating system;
 version information;
 a protocol;
 a network event; or
 a process event.

3. The method of claim 1, wherein the context information is collected via a multiplexer (MUX).

4. The method of claim 1, further comprising registering with a thin agent in the VCI, wherein the context information is collected from the thin agent.

5. The method of claim 1, further comprising:
 receiving a new alert related to network security for the VCI;
 providing features related to the new alert as inputs to the machine learning model; and
 receiving a given output from the machine learning model indicating whether the new alert is a false positive.

6. The method of claim 5, further comprising:
 determining that the given output from the machine learning model indicates that the new alert is a false positive; and
 performing one or more of:
  discarding the new alert; or
  notifying the management plane that the new alert is a false positive.

7. The method of claim 5, further comprising:
 determining that the given output from the machine learning model indicates that the new alert is not a false positive; and
 notifying the management plane of the new alert.

8. The method of claim 1, further comprising notifying the management plane based on a given output from the machine learning model indicating that a new alert is a false positive.

9. The method of claim 8, wherein notifying the management plane based on the given output from the machine learning model is further based on determining that a plurality of alerts generated by the IDS based on the signature are indicated, by a plurality of outputs from the machine learning model, to be false positives.

10. An apparatus for remediating false positives, comprising:
 an event and correlation engine of a host, the event and correlation engine configured to:
  receive an alert related to network security for a virtual computing instance (VCI) on the host, wherein the alert was generated by an intrusion detection system (IDS) running on the host based on a signature associated with a potential security threat;
  collect, in response to receiving the alert, context information from the VCI; and
  provide a notification to a management plane based on the alert and the context information; and
 a machine learning engine of the host, the machine learning engine configured to:
  receive, from the management plane, based on the notification, an indication of whether the alert is a false positive; and
  train a machine learning model based on the alert, the context information, and the indication to determine whether a given alert is a false positive, wherein the training comprises:
   providing inputs to the machine learning model based on the alert and the context information;

receiving, from the machine learning model, based on the inputs, one or more outputs indicating whether the alert is a false positive;

comparing the one or more outputs to the indication; and adjusting one or more parameters of the machine learning model based on the comparing until an output of the one or more outputs matches the indication or until one or more other conditions are met.

11. The apparatus of claim 10, wherein the context information comprises one or more of:
files read;
files written;
user information;
application information;
an operating system;
version information;
a protocol;
a network event; or
a process event.

12. The apparatus of claim 10, wherein the context information is collected via a multiplexer (MUX).

13. The apparatus of claim 10, wherein the event and correlation engine is further configured to register with a thin agent in the VCI, wherein the context information is collected from the thin agent.

14. The apparatus of claim 10, wherein the machine learning engine is further configured to:
receive a new alert related to network security for the VCI;
provide features related to the new alert as inputs to the machine learning model; and
receive a given output from the machine learning model indicating whether the new alert is a false positive.

15. The apparatus of claim 14, wherein the machine learning engine is further configured to:
determine that the given output from the machine learning model indicates that the new alert is a false positive; and
perform one or more of:
discarding the new alert; or
notifying the management plane that the new alert is a false positive.

16. The apparatus of claim 14, wherein the machine learning engine is further configured to:
determine that the given output from the machine learning model indicates that the new alert is not a false positive; and
notify the management plane of the new alert.

17. A non-transitory computer-readable medium comprising instructions that, when executed by one or more processors of a computing system, cause the computing system to perform a method for remediating false positives for a network security monitoring component, comprising:
receiving, by a host, an alert related to network security for a virtual computing instance (VCI) on the host, wherein the alert was generated by an intrusion detection system (IDS) running on the host based on a signature associated with a potential security threat;

collecting, by the host, in response to receiving the alert, context information from the VCI;

providing, by the host, a notification to a management plane based on the alert and the context information;

receiving, by the host, from the management plane, in response to the notification, an indication of whether the alert is a false positive; and training, by the host, a machine learning model based on the alert, the context information, and the indication to determine whether a given alert is a false positive, wherein the training comprises:
providing inputs to the machine learning model based on the alert and the context information;
receiving, from the machine learning model, based on the inputs, one or more outputs indicating whether the alert is a false positive;
comparing the one or more outputs to the indication; and
adjusting one or more parameters of the machine learning model based on the comparing until an output of the one or more outputs matches the indication or until one or more other conditions are met.

18. The non-transitory computer-readable medium of claim 17, wherein the context information comprises one or more of:
files read;
files written;
user information;
application information;
an operating system;
version information;
a protocol;
a network event; or
a process event.

19. The non-transitory computer-readable medium of claim 17, wherein the context information is collected via a multiplexer (MUX).

20. The non-transitory computer-readable medium of claim 17, wherein the method further comprises registering with a thin agent in the VCI, wherein the context information is collected from the thin agent.

21. The non-transitory computer-readable medium of claim 17, wherein the method further comprises:
receiving a new alert related to network security for the VCI;
providing features related to the new alert as inputs to the machine learning model; and
receiving a given output from the machine learning model indicating whether the new alert is a false positive.

22. The non-transitory computer-readable medium of claim 21, wherein the method further comprises:
determining that the given output from the machine learning model indicates that the new alert is a false positive; and
performing one or more of:
discarding the new alert; or
notifying the management plane that the new alert is a false positive.

* * * * *